Jan. 17, 1956  J. CORYDON II  2,731,290
BUMPER GUARDS
Filed June 19, 1951

INVENTOR.
Jeff Corydon II
BY
J. Warren McCaffrey
Atty

United States Patent Office 2,731,290
Patented Jan. 17, 1956

2,731,290

BUMPER GUARDS

Jeff Corydon II, Chicago, Ill.

Application June 19, 1951, Serial No. 232,425

6 Claims. (Cl. 293—71)

This invention relates to bumper guards for all types of vehicles but particularly to bumper guards made of rubber or rubber-like materials for automobiles.

The bumper guard of this invention is an improvement over those disclosed in my copending applications, Serial Numbers 170,415 and 191,421, and by actual test is superior to them in some respects and much more practical.

The objects of this invention are to provide bumper guards of simple, durable and dutiful construction that may be mounted on metal bumpers of automobiles along with the usual metal bumper guards, but preferably are mounted on the same in place of the usual metal bumper guards.

Further objects of this invention are to provide a bumper guard of such shape and construction that it performs its several functions efficiently, that is, absorbs shock, deadens noise, decreases tendency of automobile bumpers to slide over this bumper guard, and facilitates disengagement of an automobile bumper or bumper guard that had slid over and became engaged with the bumper guard of this invention.

A special object of this invention is to provide a bumper guard that can be securely attached to any of the metallic bumpers on the popular makes of today's automobiles regardless of the contour of the face of the bumper. Adequate provisions are made in the bumper guard of this invention to make anticipated slight adjustments easily if any are required to be made.

Another special object is to provide suitable means for fastening a resilient bumper guard of this invention to almost any configuration of metallic bumper bar, which means had first been shaped to match the configuration of the bumper bar and then had been coated with a resilient material so that, when the fastening means had been tightened in place inside this bumper guard and to the face of the bumper bar, the joining of the fastening means with the wall of the bumper guard would be airtight.

I am convinced that the ideal protection for all vehicles that come in contact with solid or relatively immovable objects is to equip such vehicles with bumper guards as disclosed in this and my other copending applications so that such vehicles actually bump air. To do so the air may be sealed in the bumper guards at either atmospheric or greater pressures, or the bumper guard may be unsealed but have a restricted opening so that when the guard is compressed against any object air escapes and when the pressure on the guard is released air re-enters the bumper guard, or a pair of check valves may be installed in the rear of the bumper guard whereby a restricted orifice allows air to escape slowly when the guard is under compression and when the pressure on the guard is released the air rushes into the guard through a much larger check valve.

Naturally the bumper guard has to be made out of a resilient material so as to permit it to be temporarily deformed by exterior pressure and still return to normal shape when the exterior pressure is removed, also to allow the fastening plate which is inserted inside the bumper guard of this invention to squeeze the rear wall of the bumper guard so that it conforms to the face of the bumper on which the guard is mounted. Therefore, the casing or shell of my bumper guards may be constructed out of natural rubber, synthetic rubber, or any rubber-like, plastic or yieldable materials.

I have impoved on the shape and construction of my original bumper guards so as to strengthen their structure and to increase their application to the end that they function dutifully and efficiently for longer periods without repairs or replacements. In the first place I have worked up a leading edge on the front of the guard into a protruding nose so that a side or sectional view (Figure 3) simulates somewhat the capital letter S, and I sometimes refer to it as my Ess-Guard. The protruding nose of the guard tends to stop any bumper that strikes this bumper guard from rising up and sliding over the top of the guard. In the second place, should any automobile bumper slide over the top of my bumper guard, I have shaped the top rear of my guard into a smooth curve which rises in an arc from the metal bumper to the protruding nose (see Figure 3), which will enable the bumper that was forced over the top of my guard to be easily pulled back and be disengaged. In addition the rubber-like material of my bumper guard will bend forward and slightly downward during the disengaging pull to facilitate the withdrawal of the bumper over the bumper guard.

I have also standardized the shape of the rear wall of the guard where it contacts the auto bumper. It has proven desirable to widen this wall so as to obtain wider contact along the bumper bar to better support my guard when it is struck off center, or a glancing blow. This new development led to the designing of a new means for securely fastening my bumper guard to an auto bumper bar which means will make the rear wall of the bumper guard conform to the shape of the face of the bumper that my guards are mounted on. To do this I provide a plate that is shaped so as to correspond to the face of the bumper the guard is to be mounted on. A carriage bolt may be suitably fastened to the plate either before or after the shaping operation. Then the plate is installed inside the bumper guard with the bolt extending through the rear wall of the bumper guard. The guard is securely fastened to the bumper by usual bolt, nut and washer arrangement. The tightening of the plate against the bumper will squeeze the backwall of the guard between the plate and the bumper. Because the plate had previously been shaped similarly to the face of the bumper and because the shell of the guard is made of resilient material the close conformance of the rear wall of the guard to the bumper is accomplished.

The foregoing special objects and other attainments are accomplished by the novel construction, combination and arrangement of parts hereinafter described and illustrated in the accompanying drawing wherein a preferred form of the invention is shown.

Figure 1:
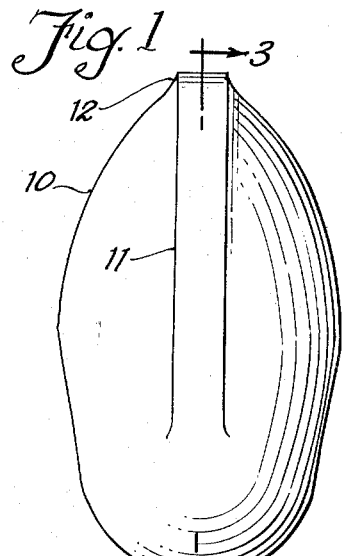
Figure 1 is a front elevational view of the bumper guard.
Figure 2:
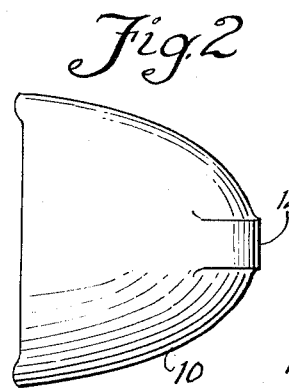
Figure 2 is a plan view looking down on the top of the bumper guard.

In the accompanying drawings like reference characters are employed to designate like parts as the same may appear in any of the several views shown and 10 is the casing or shell of the bumper guard with a slightly forward edge 11 which rises from the middle front of the guard towards the top and gradually extends out more and more until it terminates in a protruding nose 12 at the top of the guard.

A means 13 is indicated for admitting air into and releasing it out of the bumper guard. This means can be the usual type of valve for admitting air under pressure and holding the air under pressure in the guard, or it may be a very small hole in the shell without any valve mechanism so that air can pass in and out freely, or it may be a pair of check valves, one more restricted than the other so as to release air from the guard slowly when it is being compressed and the larger check valve for admitting air quickly to the guard when the compression on the guard has been released. Another type of valve would have a plastic rubber-like section in a small rubber capsule through which a hypodermic means may be inserted and air injected or removed from the guard and the hypodermic means then withdrawn at which time the plastic center section seals over the hole caused by the injection and removal of the hypodermic means.

Figure 3:
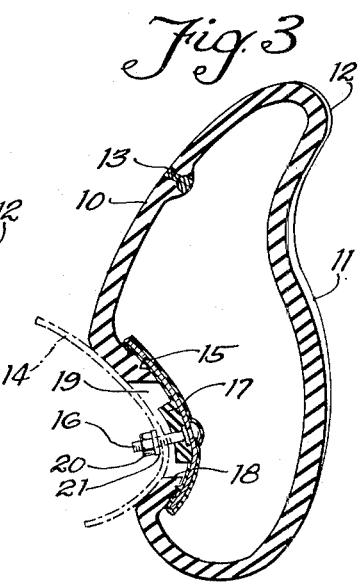
Figure 3 is a vertical sectional view along line 3—3 of Figure 1.
Figure 7:
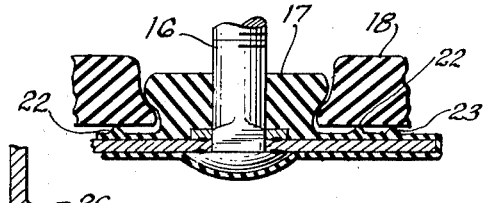
Figure 7 is a partial sectional view of the fastening plate shown with its positioning pad fitted to the bevelled slots in lower rear wall of the bumper guard.

The bumper on which the guard is mounted is indicated as 14 in Figure 3 which view also shows clearly the method and means for fastening the guard 10 to the bumper 14. A metal plate 15 with a bolt 16 fastened thereto is inserted inside of the bumper guard and adjusted therein so that the previously shaped plate conforms substantially with the inside backwall of the guard and the rectangular rubber pad 17 is slidably fitted into bevelled slots in the rear wall 18 of guard 10. The slidable fitting of the pad 17 in the slotted rear wall 18 is clearly shown in Figure 7 and the extension of the pad 17 and the bolt 16 through the rectangular slot 19 in the rear wall of the guard is shown in the sectional view of Figure 3. The entire operation of adjusting the plate inside of the guard with the rubber pad 17 slidably fitted in the slotted rear wall 18 is all completed before the guard 10 is applied to the auto bumper 14 by projecting bolt 18 through a hole in the bumper and fastening it thereto by means of nut 20 and washer 21. In other words the guard with its fastening means adjusted is assembled complete before it is fitted and fastened to bumper. The interlocking of the rubber pad 17 in the slotted rear wall 18 holds the plate in the rear wall of the guard and keeps it from falling forward into the guard which, if it happened, would require reaching through slot 19 to get hold of the plate and adjusting it in place in the rear wall 18 again.

One of the outstanding features of my bumper guard is the means for fastening it to the bumper bar regardless of the contour of the face of the bumper bar. Accordingly, I have shown extra views of the fastening plate and will describe its construction and method of making in some detail. It should be readily apparent that if the plate is to be coated with rubber or other resilient material it might be advantageous in the case of simple gradual curves to mold the material around the plate before bending or shaping. However, in the case of sharply angled bumper faces the matching fastening plate had better be shaped first and then coated with resilient material. When considering quantity production of these fastening plates, I believe it best and prefer preforming the plates without any hole for the carriage bolt and then coating everything but the threaded length of the bolt with the resilient material. However, I herewith describe both methods of making these all-important fastening members.

Figure 5:
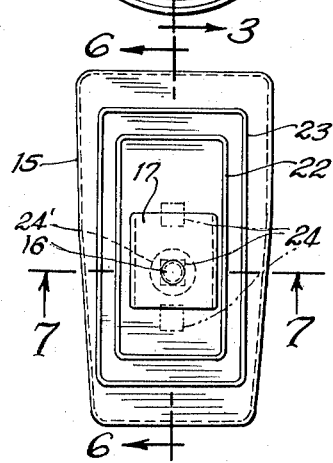
Figure 5 is an elevational view of the fastening plate before shaping.
Figure 4:
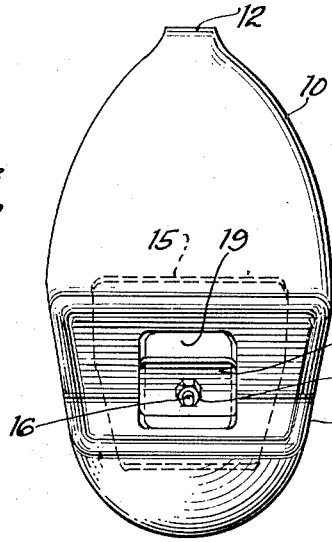
Figure 4 is a rear elevational view of the bumper guard.

Figure 5 shows a metal plate 15 which is cut in the shape substantially as shown which is approximately the shape of the inside lower rear wall 18 of the bumper guard. A carriage bolt 16 is inserted through a square hole 24 in the plate and a washer 24' is fitted over the square shoulder of the bolt and both the head of the carriage bolt and the washer are spot welded to opposite sides of plate 15. The flat plate may be rubber coated by molding about 1/32 of an inch of rubber on all parts of the plate and at the same time molding positioning pad 17 around the carriage bolt 16 and also the triangularly shaped sealing ridges 22 and 23. It is not necessary that the coating be rubber but may be any rubber-like material, or plastic, or other resilient material that could be successfully molded around the plate. The dotted lines around the edges of plate 15 in Figure 5 are to indicate the edges of the plate while the solid outside lines are to indicate the edges of the rubber-like material. Then the assembled fastening means is bent and shaped by pressure so as to match the shape of the face of the bumper bar the guard is to be mounted on.

Figure 8:
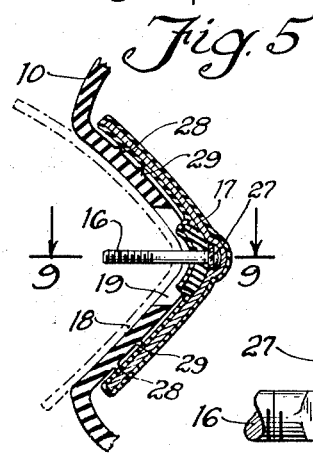
Figure 8 is a partial sectional view in elevation of a fastening plate with carriage bolt which plate had been shaped and coated with resilient material and is shown as it squeezes lower real wall of guard to conform to bumper bar.
Figure 9:
Figure 9 is a partial horizontal view along section line 9—9 of Figure 8 which shows a method and means for fastening carriage bolt to fastening plate from which the coating of resilient material has been removed.

I believe the preferred manner of making the fastening means would be to start with the same shaped plate 15 and instead of punching one of the square holes 24 along a vertical center line as outlined in Figure 5 the plate could be pressed in a forming die to match the contour of the face of the bumper that the guard is to be mounted on. In the same operation a bowl-like depression 25 could be formed in the plate and also a rectangular depression 26 across the bowl-like depression 25 but not as deep, as shown in Figure 9. The spherical head of a carriage bolt 16 is inserted into the bowl-like depression 25 and a welding clip 27 with a square hole in its center is slipped over the carriage bolt and seated in the rectangular depression 26 so that the square hole fits snugly around the square shoulder of the carriage bolt. Then the welding clip is welded in the rectangular depression to the plate and thereby securely attaches the carriage bolt to the plate. A rubber or rubber-like positioning pad 17 is slipped over the carriage bolt and then the assembled fastening plate can be dipped into liquid rubber, latex, neoprene, plastisol, or any another plastic or rubber-like material that has resilient properties. After drying, or baking in an oven if necessary, the fastening means thus coated with a resilient material can be employed inside the bumper guard 10 to squeeze its lower rear wall 18 tight against the face of the bumper bar it was designed to be mounted on as shown in Figure 8.

Figure 6:
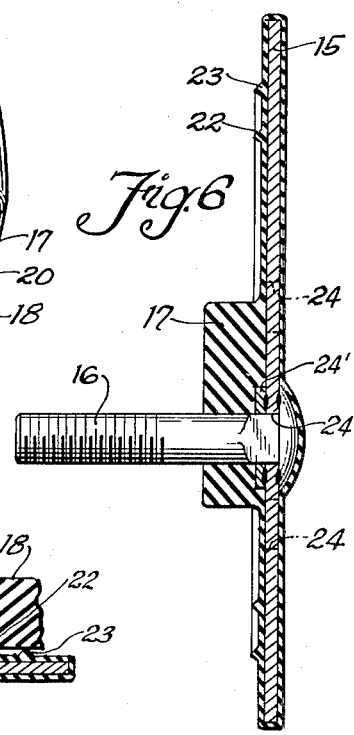
Figure 6 is a vertical sectional view of the fastening plate before shaping taken along line 6—6 of Figure 5.

In Figures 5 and 6 the triangular sealing ridges 22 and 23 are clearly shown and their function is to seal the junction of the rubber coated plate 15 with the lower rear wall 18 of the bumper guard so that air cannot be forced out through the rectangular hole 19 when the bumper guard is being compressed by external force. The sealing ridges are molded on the fastening plate in such a manner that the ridges will frame the carriage bolt 16 and positioning pad 17 and when applied to the rear wall 18 will also frame the rectangular opening 19. Because the shell of the guard and the coating on the fastening plate are made of resilient materials, it may be unnecessary to use sealing ridges. But if it is found necessary to use them so as to insure an air-tight junction between the plate and the rear wall, then it might be more practical to mold the triangular sealing ridges 28 and 29 around rectangular opening 19 on the inside of the casing when molding the bumper guard, because it would be impractical to form them on the fastening plate when using the dipping method to cover the plate with rubber or rubber-like material. This construction is shown in Figure 8.

I have also shown alternate positions for the square hole 24 in the fastening plate 15, shown in Figure 5, because in the popular priced automobiles today the manufacturers have designed their bumper bars with holes to locate their metallic bumper guards, and in general they are high, low or intermediate. Because the bumper guard of my invention may replace the metallic bumper guards already in place before it is adopted as original equipment on autos, I wish to make provision for the easy application of my bumper guards to the bumper bars as they already exist, but there will only be one hole in each.

It is to be understood that this invention is capable of various adaptations and that modifications and changes may be made which will come within the scope of the appended claims, although not shown in detail in the preferred form of the invention illustrated in the accompanying drawing.

What I claim is:

1. A bumper guard consisting of a hollow casing made out of resilient material and means coated with resilient material for fastening said casing to a bumper bar, said casing having a broad relatively flat lower rear wall, a rounded upper rear wall that rises in a smooth arc from said lower rear wall to a bulbous projection in the upper front of said casing, a narrow edge that rises substantially vertically from the central front section of said casing to join said bulbous projection, means in the upper rear wall for the passage of air into and out of said casing, a substantially vertical rectangular slot in said lower rear wall, said first mentioned means coated with resilient material fitted through said slot to said lower rear wall, and bolting means fastened to said same first mentioned means extending through said slot for fastening said casing to a bumper bar.

2. A bumper guard consisting of a hollow casing made out of resilient material and means thinly coated with resilient material for fastening said guard to an automobile bumper bar, said casing having a broad relatively flat lower rear wall, a rounded upper rear wall that rises in a smooth arc from said lower rear wall into a bulbous projection in the upper front of said casing, a narrow edge that rises substantially vertically from the central front section of said casing to help form said bulbous projection, valvular means in the upper rear wall for admitting and holding air under pressure in the casing, a rectangular slot centrally disposed in said lower rear wall and having vertical bevelled edges, said first mentioned means thinly coated with resilient material carrying a positioning pad fitted to said bevelled edges, and bolting means joined to said last previous coated means and extending through said slot to fasten said guard to an auto bumper bar.

3. A casing made out of plastic material and shaped so as to provide a frontal edge that terminates in a bulbous knob at the top of the frontal edge, said casing having a relatively thick lower rear wall with an opening therethrough spaced rearwardly and below said frontal edge, means for closing said slot and fastening said casing to a bumper comprising a preformed plate with a bolt fastened thereto, which plate had been coated with plastic material before inserting through said slot into said casing with the bolt extending outward through said slot, said plastic coated means squeezing the lower rear wall of said casing to a bumper and sealing said slot when said means is bolted to a bumper.

4. A bumper guard made out of rubberlike material comprising a casing with a slot in its lower rear wall and a preformed means suitable for insertion through said slot into said casing and adapted to seal said slot when fastened to a bumper, said casing having a frontal edge that terminates at the top in a bulbous knob, said preformed means consisting of a plate that has been bent to conform to the face of said bumper and had a bolt fastened centrally thereto, which plate had been coated thinly with plastic material and can be bolted to said bumper in such a manner so as to securely fasten said casing to said bumper and so as to close said slot air tight.

5. Manner of providing an air cushion between moving objects featuring a bumper guard with a casing made out of rubber-like material for containing a quantity of air and a means for fastening said casing to the face of a bumper, said means comprising a preformed plate with a bolt fastened centrally thereto, which plate had been thinly coated with a rubber-like material and is suitable for insertion through a slot in said casing with said bolt extending outward through said slot, said fastening means when tightened to the face of said bumper squeezes the wall of said casing thereto and simultaneously closes said slot and seals the air in said bumper guard.

6. Manner of providing a cushion of air between a bumper and any object it might come close to, featuring a guard made out of rubber-like plastic material and a preformed means for sealing a quantity of air in said guard and simultaneously fastening said guard to said bumper, said guard comprising a casing with a frontal edge that terminates at the top in a forward projection, said casing also having a slot in its lower rear wall and means in its upper rear wall for admitting air under pressure into said casing, said preformed means consisting of a plate that had been shaped to conform with the face of said bumper and to completely cover said slot when inserted into said casing and held against the inside of said lower rear wall, said plate having a bolt fastened centrally to the back thereof suitable for projecting out through said slot and being securely attached to said bumper, said plate being thinly coated with rubber-like plastic material so as to simultaneously squeeze said lower rear wall against said bumper and seal said slot air tight when said bolt is tightened to said bumper.

References Cited in the file of this patent

UNITED STATES PATENTS

| | | |
|---|---|---|
| 1,541,508 | Johnston | June 9, 1925 |
| 2,236,507 | Kreitz | Apr. 1, 1941 |
| 2,243,462 | Fageol | May 27, 1941 |